Aug. 6, 1940.  LE GRAND S. WHEDON  2,210,863
ADJUSTABLE SEAT STRUCTURE
Filed Dec. 22, 1936  2 Sheets-Sheet 1
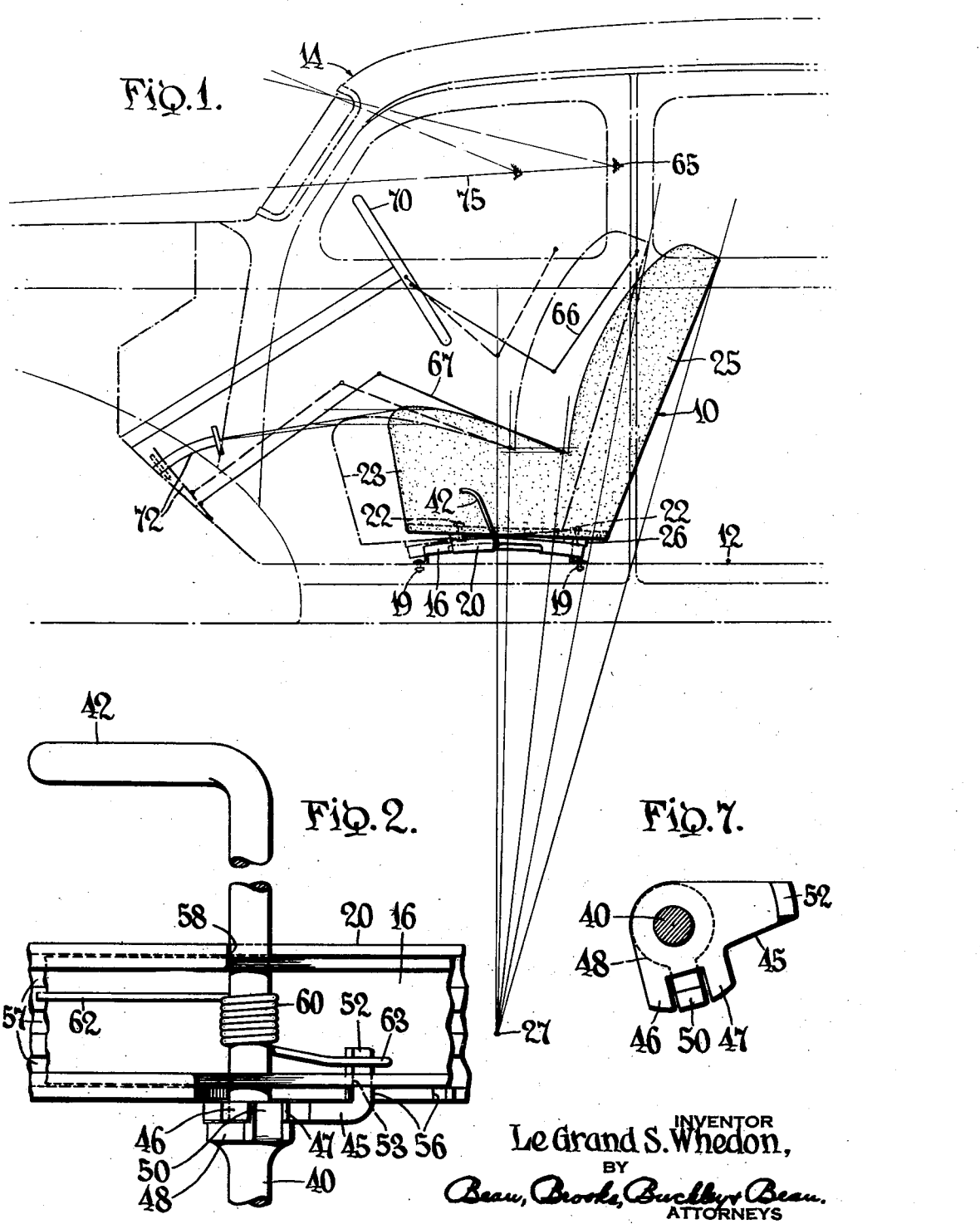
INVENTOR
Le Grand S. Whedon,
BY
Bean, Brooks, Buckley & Bean.
ATTORNEYS

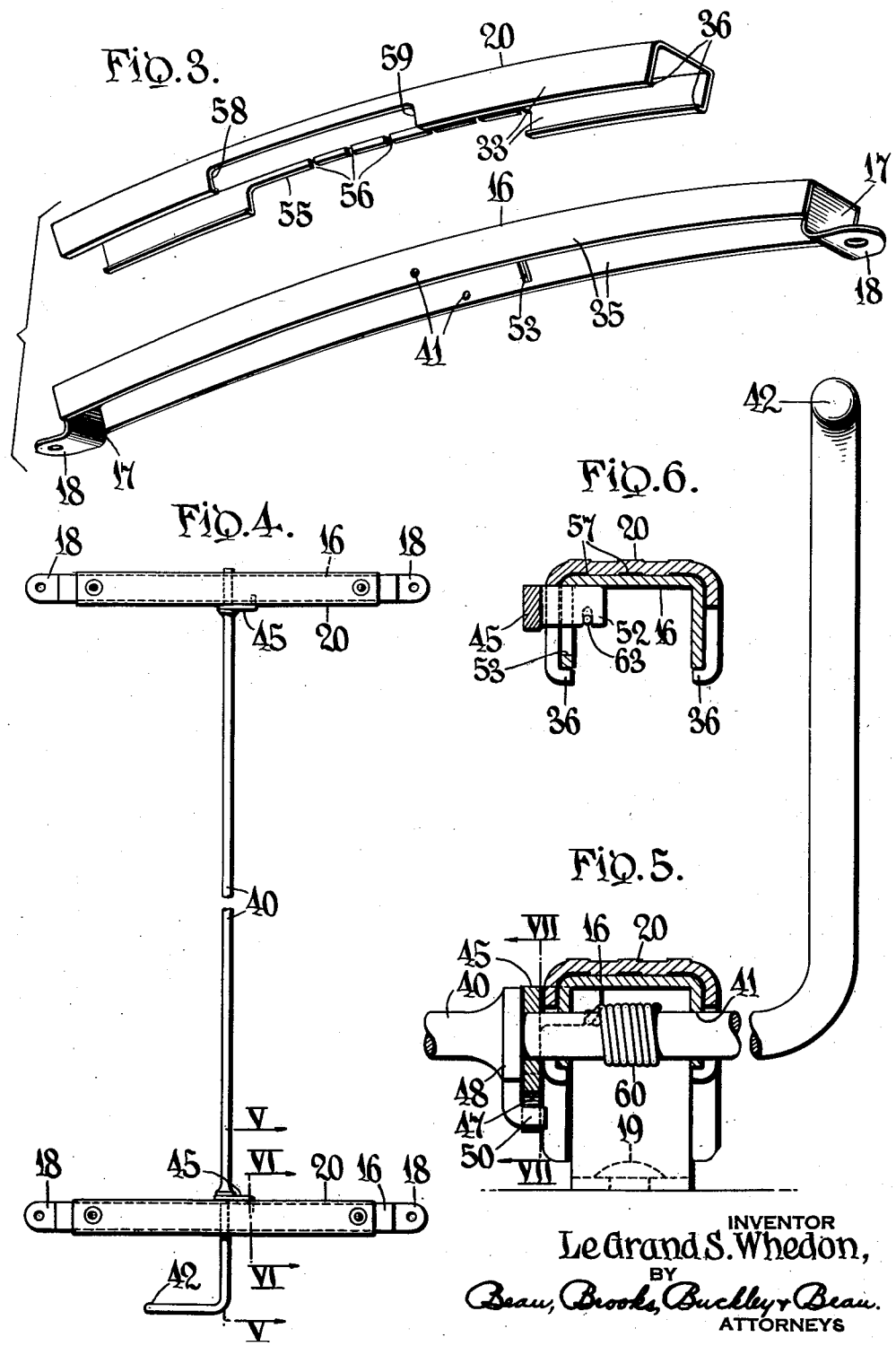

Patented Aug. 6, 1940

2,210,863

UNITED STATES PATENT OFFICE 2,210,863

ADJUSTABLE SEAT STRUCTURE

Le Grand S. Whedon, Medina, N. Y., assignor of twenty-five per cent to Barton A. Bean, Jr., Buffalo, N. Y.; Milton J. Whedon, executor of said Le Grand S. Whedon, deceased Application December 22, 1936, Serial No. 117,206

8 Claims. (Cl. 155—14)

This invention relates to an adjustable seat installation for vehicles, or other structures, and it has particular relation to an improved supporting and operating mechanism for adjusting the seating elements in such manner as to conform readily to various positions desired by persons of various heights, weights, or other physical characteristics or preferences that might require either average or special seating arrangements.

A seating unit of a vehicle, including the operator's seat that is generally composed of seat bottom and back, should be capable of adjustment with respect to the operator's lines of vision and the several vehicle controls in accordance with the physical characteristics of various operators in order that any individual operator, within a substantially universal range of physical characteristics of persons capable of driving an automotive vehicle, can be positioned in such manner as to secure the maximum comfort, as well as maximum vision and convenience in manipulation of the vehicle control elements.

Although a great many designs of adjustable seats have heretofore been proposed for motor vehicles, and certain types of such seats have been incorporated in the vehicles, it is well known that they have been lacking in efficiency and practicability, as well as being expensive to such degree as to be a serious problem in the manufacture of motor vehicles.

In a seating arrangement constructed according to the invention herein disclosed, an improved structure of seat adjusting mechanism is provided, together with an improved relationship and coordination between all portions of the seat structure with reference to the surrounding vehicle parts, such as controls, doors, windshields, peculiarities of body construction, etc. The simplicity and adaptability of design of the improved seating structure is such that vehicle bodies of various designs can be used without special modifications with reference to the seating facilities. Thus a broader field for improvement or modification of body designs in automobile manufacture is rendered available. In addition to the adaptability of the seat structure of this invention as original equipment in the manufacture of all types of motor vehicles, such structure can also be applied very inexpensively to used vehicles which have already been equipped with previously known installations which may be inefficient or obsolete, and the advantages of the invention can be realized as much as if the used vehicle had been especially designed to receive the new improvement.

One object of the invention is to provide an improved arrangement for supporting and guiding a seat structure in forward and rearward movements, and wherein a single phase of movement subjects the seating elements to forward or rearward sliding action, tilting motion, raising or lowering motion, and variation in relative elevation of the front and rear portions of the seat structure.

Another object of the invention is to provide an improved adjustable seat structure having a minimum number of parts and connections for insuring maximum variation in adjusted positions of the structure.

Another object of the invention is to provide an adjusting mechanism adapted to be installed in conjunction with a seat structure and including an improved unitary locking device which insures positive adjustment of the seat structure within its limits of movement.

A satisfactory embodiment of the invention includes arcuate guides or supports upon which the seat structure is supported for forward or rearward movement and such movement causes the rear of the seat structure to be lowered when moved rearwardly and the front thereof to be raised concurrently, while the seat structure is also tilted; or the movements can be reversed when the seat structure is moved forwardly from its rearward position.

An improved lost motion locking mechanism connected to the arcuate guides, and having a handle conveniently accessible to the vehicle operator, compensates for slight play in the interfitting parts of the guides and prevents binding of any of the mechanism.

In the drawings:

Fig. 1 is a side elevation of a seat structure installed in a conventional vehicle that is shown in broken lines;

Fig. 2 is a fragmentary bottom plan of a supporting channel and latching mechanism incorported therewith;

Fig. 3 is a perspective of arcuate seat supporting rails or channels in disassembled relation;

Fig. 4 is a plan of supporting and adjusting channel members adapted to be incorporated in the seat structure;

Fig. 5 is a cross section, on a larger scale, taken substantially along the line V—V of Fig. 4;

Fig. 6 is a cross section taken substantially along the line VI—VI of Fig. 5; and Fig. 7 is a cross section taken substantially along the line VII—VII of Fig. 5.

In practicing the invention, a seat structure 10 is installed upon a suitable base 12, which can be in the form of a floor of a vehicle 14, or other suitable support. Two parallel arcuate rails 16 of channel form are provided with extensions 17 at opposite ends thereof terminating in flat plate like portions or flanges 18 which are bolted substantially horizontally, as indicated at 19, upon the base 12 to provide stationary supports.

Two upper arcuate rails 20 of channel form are interfitted in substantially telescoping relation with the stationary channel rails 16 and are connected by means of suitable fastening elements 22, such as screws or bolts, below and adjacent opposite sides of the seating structure and to the lower side of a seat bottom 23 which forms a part of the seat structure and with which a seat back 25 is assembled.

In order that the channel rails 20 can be firmly secured to, and properly assembled with, the seat bottom 23, a plurality of spacers 26 are disposed between opposite end portions of the rails and the seat bottom, and the fastening elements 22 pass through these spacers.

These interfitting channel rails 16 and 20 adjacent each side of the seat structure slidably engage each other longitudinally throughout greater portions of their lengths. Thus it will be apparent that the upper rails 20 are movable to carry the seating structure thereon in directions forwardly and rearwardly upon the arcuate supporting surfaces of the lower stationary rails 16.

It should be understood that each channel rail 16 is so installed with reference to the other parts of the arrangement described that the entire structures of the seat bottom and seat back are outside or above the arcs or curvatures described by the channel rails; that is, the radius describing the curvature of the arc of each rail 16 extends away from and below the seating portion of the structure toward the axis of curvature, which is indicated at 27. The arc or curvature of the upper rail 20 is described about the same axis 27 as the arc or curvature of the stationary rail 16 and the radius is greater than length of the chord that subtends the arc of either rail 16 or 20. The radius is also greater than the depth of the seating structure, that is, greater than the distance between the front and rear of the seat bottom 23.

Each stationary rail 16 is so arranged that its higher portion is intermediate its ends while its opposite end portions slope outwardly and downwardly. The sides 33 of the upper channel rails 20 are disposed along the sides 35 of the stationary channel rails 16 and the marginal portions of the sides of the upper rails are bent inwardly to form lips 36 extending beneath the edges of the stationary rail sides 35. This arrangement prevents separation of the upper and lower channel rails and insures proper guiding of the upper rails upon the lower rails.

An adjusting rod 40 extends transversely in rotatable relation through openings 41 in the sides 35 of the stationary rails 16, and one end thereof is bent at an angle to form an operating handle or lever 42. Adjacent the inner side of each stationary rail 16 a latch 45 is mounted relatively loosely and pivotally upon the rod 40 which passes therethrough, and a portion of the latch adjacent its connection to the rod is provided with a pair of spaced lugs 46 and 47. An integral enlargement or collar 48 formed upon the rod 40 is provided with an integral or rigid finger 50 disposed between the lugs 46 and 47 and in such manner that the rod can be rotated a limited degree in the stationary rails 16 before actuating the latches 45. Each latch is confined pivotally on the rod 40 between the enlargement 48 and the adjacent rail side. The outer end portion of each latch is in the form of a rigid locking finger 52 disposed at right angles thereto and extending freely through a slot 53 formed in the adjacent side of the lower channel rail 16.

One side portion of each upper channel rail 20 is cut away, as indicated at 55, and the channel side thus narrowed, is provided with a series of notches 56 in any of which the finger 52 is adapted to be engaged. The other side portion of each channel rail 20 is cut away to form opposed stop shoulders 58 and 59 which, in conjunction with the rod 40, limit relative sliding movement between the upper and lower channel rails on each side of the seat structure. Suitable grooves 57 formed longitudinally in the inner sides of the rails 20 provide for retention of lubricant to insure minimum frictional resistance to relative sliding movement of the rails 16 and 20.

A torsion spring 60 is wound about the rod 40 between the sides of each stationary channel rail 16 and one end 62 of the spring bears against the web of the channel rail, while its other end 63 is engaged with the finger 52 of the latch. This spring constantly exerts force tending to move the latch into engaged position with respect to the notches 56.

It is to be understood that the play or lost motion provided between the finger 50 and the lugs 46 and 47 is such that the latch finger 52 at one side of the seat structure can be engaged in a notch 56 before the other latch is so engaged on the other side of the seat structure; or one latch finger at one side of the structure can be engaged while the other finger on the other side of the structure impinges upon the edge of the channel rail adjacent the notch into which the latch finger will be forced as soon as the parts assume their registering relation. This arrangement compensates for any play that may occur in operating the channel rails and prevents any tendency toward binding of the operating parts, as well as obviating the inconvenience of installing precision locking elements in the mechanism.

In operating the adjustable seat structure described, it should be remembered that the stop shoulders 58 and 59 serve to limit the movement of the seat structure along the contacting arcuate surfaces of the supporting rails 16 and 20. Assuming that the seat structure is in the position indicated in the full lines of Fig. 1, it will be apparent that the rear portion of the seat bottom 22 is in its lower position and the front edge of the seat bottom is in its raised position, while the seat back is in a rearwardly tilted position. Thus maximum or adequate leg space is provided for taller persons, such as one six and one half feet tall. At the same time, proper position of the eyes, indicated at 65, is insured for maximum unobstructed vision. Arms and legs of the taller person are indicated at 66 and 67, respectively, in full lines in Fig. 1, and represent a normal posture in which the person may operate the vehicle comfortably.

In order to adjust the seat structure forwardly, the vehicle operator actuates the handle 42 to release the locking elements 45 from the upper rails 20, and then, by drawing himself forwardly, which action can be facilitated by gripping the steering wheel 70, he can assume the desired change in posture. The seat structure can be moved to as many locations of adjustment as desired within the limits of forward and rearward movement along the arcuate guides or tracks from the full line position to the broken line position illustrated in Fig. 1.

After the seat structure has been moved to the extreme forward position indicated by the broken lines referred to, it will be observed that the front of the seat bottom has been lowered, as well as forwardly moved, and that the rear portion of the seat bottom has been raised in addition to its forward movement. However, the vertical distance from the steering wheel to the seat bottom 23 has not increased during this movement, but in fact has been decreased slightly, although the operator's body or spinal column has been elevated. This adjustment is suitable for a person of smaller stature to compensate for shorter leg length at the lowered front edge of the seat bottom and to direct in forward movement the legs of the operator toward the pedal controls 72 of the vehicle, as well as to provide for the elevation of the operator's body to the proper height. Therefore, an operator only four and one half feet tall can be seated comfortably, and at the same time within convenient reach of all of the vehicle controls. At the same time, the line of vision is approximately the same for the taller person, with the exception that the eyes of the smaller person are farther forward, and with reference to operators of various heights and physical characteristics, the adjustment is variable to secure the most convenient and proper line of vision. This line does not change materially from the line indicated at 75 (Fig. 1) for various operators, or, in other words, operators of various physical characteristics can be so seated that their line of vision substantially coincides with that illustrated while maintaining the most desirable position for efficient driving and comfort.

In addition to the forward and rearward movement of the seat bottom in the manner specified, the upper portion of the seat back moves in tilting relation proportionately a greater degree than the seat bottom in its tilting action because of the greater distance of the upper portion of the seat back from the axis 27 about which the structure is movable. For example, for a radius of four feet about which the arcuate channel rails operate, the arcuate movement of the upper portion of the seat back is approximately six and one half inches, including two and one half inches greater movement than the extent of arcuate relative movement at the location of slidable engagement of the arcuate rails. These figures are mentioned for the purpose of illustration and it should be understood that proper functioning of the invention is not dependent upon the values stated. From this description it will be apparent that the tilting action of the seat back is accentuated in proper directions to cooperate or harmonize with the forward or rearward movement of the seat structure, and thus, to produce the most desirable results in seating facilities.

Therefore, in one phase of movement, such as movement from the full line position to the broken line position of the parts illustrated in Fig. 1, four important phases of adjustment are achieved, viz: (1) forward adjustment, (2) the front of the seat bottom is lowered, while (3) the rear of the seat bottom is elevated, and, at the same time, (4) the seat back is tilted in degrees proportionately greater than the corresponding angular movement at the location of the arcuate supporting surface. In the opposite or rearward movement of the seating unit, the phases of adjustment are, of course, reversed.

It is important to emphasize the fact that a limited degree of relative movement of approximately four inches along a curvilinear path, which includes the area of supporting engagement between only two elements (seating unit and support), can produce the several desirable results and phases of adjustment specified. The variation in position of the parts of the seating unit along a single path is thus so provided that lesser bodily movements of the unit produce magnified values of adjustment in the relationship of the body and limbs of the vehicle operator to the seat structure and vehicle body and in such manner as to insure simple selection of the most desirable seating and driving position for various operators.

Although only one form of the invention has been shown and described in detail, it will be apparent to those skilled in the art that the invention is not so limited, but that various changes can be made therein without departing from the spirit of the invention or from the scope of the appended claims.

I claim:

1. In an automotive vehicle body structure having control devices and a windshield, a seating unit including a seat bottom and back disposed to the rear of said control devices in the body structure, supporting means carrying the unit for forward and rearward movement in said body structure, said supporting means and seat bottom including upper and lower interengaging guide members, the lower guide member having an upwardly curved supporting surface extending substantially longitudinally of said body structure, the upper guide member having a similarly curved lower surface said upwardly curved supporting surface and said lower curved surface interfitting along a substantially common arc, the lower surface of the upper guide member resting frictionally upon the upwardly curved surface of the lower guide member and said unit being bodily movable forwardly and rearwardly about the center of said substantially common arc of said interfitting surfaces to provide various distances from the unit to the control devices according to the limb length of various sized vehicle operators and concurrently to position operator's eyes according to a substantially common line of vision projected longitudinally of the body structure through the windshield.

2. In an automotive vehicle body structure having control devices and a windshield, a seating unit including a seat bottom and back movable to locate vehicle operators of various sizes in positions facilitating accessibility to the control devices and insuring vision approximately along a line of maximum vision through the windshield, an arcuate elongate slide disposed adjacent each side of the seat bottom and secured thereto in longitudinal direction relative to the vehicle body, an arcuate guiding member supporting each slide and having curvature corresponding substantially to the curvature of said slide for longitudinal movement of the latter thereon, means for supporting each guiding member in the vehicle body, each end portion of the slide and guide members curving downwardly away from the seat bottom, whereby movement of the seating unit on the guides in a forward direction causes movement of the seating unit to lower the knees of the operator toward control devices and to raise the head of the operator.

3. In an automotive vehicle body structure having control devices and windshield, a seating unit including a seat bottom and back movable to locate operators of various sizes in positions facilitating accessibility to control devices according to limb length and insuring vision approximately along a line of maximum vision through the windshield according to driver height, an upwardly facing convex track surface extending in a direction longitudinally of said vehicle body and being carried in the latter, said unit having a downwardly facing bearing surface engaging said track surface and being slidable forwardly and rearwardly in supported relation thereon, the forward and rearward portions of the track surface sloping downwardly away from the medial portion thereof whereby forward or rearward movement of the seat unit on the convex track surface is operative to bring the eyes of various sized operators into a common approximate line of maximum vision and at the same time is operative to coordinate distance from said unit to the control members with operator limb length.

4. In an automotive vehicle body structure having control devices and windshield, a seating unit including a unitary seat bottom and back movable to locate vehicle operators of various sizes in positions facilitating accessibility to the control devices and insuring vision approximately along a line of maximum vision through the windshield, arcuate channel members extending in a direction forwardly and rearwardly of the seating unit and having side flanges extending in substantially vertical planes, means for securing the channel members to the seat bottom, each channel member having its opposite end portions curved downwardly away from their intermediate portions, correspondingly curved stationary channel guides on which the channel members are slidably mounted for forward and rearward movement; said guides and said channel members being operable for lowering the front portion of the seat bottom and concurrently raising the rear portion thereof and at the same time imparting tilting motion to the seat back all in response to forward movement of said unit whereby the operator is coordinated relative to limb length with the control devices and coordinated relative to vision with the approximate line of maximum vision through the windshield.

5. In an automotive vehicle body structure having control devices and windshield, a seating unit including a seat bottom and back movable to locate vehicle operators of various sizes in positions facilitating accessibility to the control devices and insuring vision approximately along a line of maximum vision through the windshield, said unit having an arcuate downwardly facing slide surface upon its lower portion extending longitudinally of the vehicle body structure, said body structure having an upwardly facing track surface disposed longitudinally thereof in supporting relation to the slide surface for carrying the seating unit forwardly or rearwardly in arcuate motion thereon, said slide surface and track surface continuously contacting one another throughout a major portion of their extent regardless of their relative positions assumed in carrying the seating unit, the arcuate track surface being described about an axis below said track surface and whose vertical radius extends through substantially a medial portion of said arcuate track surface.

6. In an automotive vehicle body structure having control devices and windshield, a seating unit including a seat bottom and back movable to locate operators of various sizes in positions facilitating accessibility to control devices according to limb length and insuring vision approximately along a line of substantially maximum vision relative to the windshield according to driver height, means slidably mounting said seating unit in said body structure for forward and rearward movement, said means providing portions having rearwardly and downwardly disposed intersliding curvilinear surfaces connected respectively to said seating unit and said body structure adjacent the rear portion of the seating unit and responsive to forward movement of the seating unit from a rearward position for continuously raising the rear portion of said unit and portions having forwardly and downwardly disposed intersliding curvilinear surfaces connected respectively to said unit and said vehicle body structure adjacent the front portion of said unit and responsive to forward movement of the seating unit from a rearward position for continuously lowering the front portion of said unit concurrently with the raising of the rear portion of said unit, whereby the seating unit is operative to bring the eyes of various sized operators into substantially the approximate line of maximum vision relative to the windshield and at the same time is operative to coordinate limb length with distance from the operator to the control members.

7. In an automotive vehicle body structure having control devices and windshield, a seating unit including a seat bottom and back movable to locate operators of various sizes in positions facilitating accessibility to control devices according to limb length and insuring vision approximately along a line of maximum vision relative to the windshield according to driver height, means slidably mounting said seating unit in said body structure for forward and rearward movement, said means providing portions having rearwardly and downwardly disposed intersliding curvilinear surfaces connected respectively to said seating unit and said body structure adjacent the rear portion of the seating unit and responsive to forward movement of the seating unit from a rearward position for continuously raising the rear portion of said unit and portions having forwardly and downwardly disposed intersliding curvilinear surfaces connected respectively to said unit and said vehicle body structure adjacent the front portion of said unit and responsive to forward movement of the seating unit from a rearward position for continuously lowering the front portion of said unit concurrently with the raising of the rear portion of said unit, said front and rear contacting surfaces lying approximately within an arc drawn substantially about a common center, whereby the seating unit is operative to bring the eyes of various sized operators into substantially the approximate line of maximum vision with respect to the windshield and at the same time to coordinate limb length with distance from the operator to the control members.

8. In an adjustable seat structure, an upright support having an arched longitudinal track curved throughout the major portion of its length, a seat having a back, and a correspondingly curved channel shaped guide carried by the seat engageable with and slidable on said track thereby to simultaneously tilt the seat and back as a unit during the longitudinal travel.

LE GRAND S. WHEDON.